United States Patent [19]

Von Ruden

[11] 4,398,684
[45] Aug. 16, 1983

[54] CONNECTING APPARATUS FOR A POWERPLANT

[75] Inventor: Dennis Von Ruden, Owatonna, Minn.

[73] Assignee: Redro, Inc., Owatonna, Minn.

[21] Appl. No.: 252,153

[22] Filed: Apr. 8, 1981

[51] Int. Cl.³ .................. B64D 27/00; B64D 35/00
[52] U.S. Cl. ............................... 244/54; 267/153;
        248/557; 244/60; 244/DIG. 1
[58] Field of Search .............. 244/53 R, 54, 55, 60,
        244/13, 16, 4 R, 4 A; 248/554, 555, 556, 557,
        575, 576, 634; 74/421 A; 192/105 A, 105 B, 105
        BB; 188/378–380; 267/153

[56] References Cited

U.S. PATENT DOCUMENTS

| | | |
|---|---|---|
| Re. 18,457 | 5/1932 | Lord . |
| 1,392,655 | 10/1921 | Vinay ............................ 248/556 |
| 1,723,012 | 8/1929 | Caminex . |
| 1,853,991 | 4/1932 | Olesen . |
| 2,260,978 | 10/1941 | Klein et al. ..................... 248/557 |
| 2,318,862 | 5/1943 | Inedell et al. ................... 248/557 |
| 2,355,829 | 8/1944 | Tyler .............................. 248/556 |
| 2,605,062 | 7/1952 | Tyler . |
| 3,056,569 | 10/1962 | Bligard .......................... 248/555 |
| 3,350,955 | 11/1967 | Von Ruden . |
| 3,744,180 | 7/1973 | Mabuchi ....................... 192/105 BB |
| 3,936,012 | 2/1976 | Murray . |
| 4,195,801 | 4/1980 | Martin . |
| 4,262,863 | 4/1981 | Slusarczyk . |

FOREIGN PATENT DOCUMENTS

| | | |
|---|---|---|
| 2741792 | 3/1979 | Fed. Rep. of Germany . |
| 4065 | 10/1979 | Fed. Rep. of Germany . |
| 2397982 | 3/1979 | France . |
| 217119 | 2/1942 | Switzerland .................. 244/54 |
| 358789 | 10/1931 | United Kingdom ........... 244/60 |

Primary Examiner—Galen L. Barefoot
Attorney, Agent, or Firm—Merchant, Gould, Smith, Edell, Welter & Schmidt

[57] ABSTRACT

A connecting apparatus (16) for attaching a propeller or fan (14) to an engine (12) is disclosed. A connecting apparatus (16) includes a centrifugal clutch device (48) and drive and driven gears (40, 78) for reducing the speed of propeller (14) relative to engine (12). These elements are contained within a lubricant-filled housing comprised of housing (38) and spider bracket (34). Spider bracket (34) includes two pairs of vibration-dampening first and second mountings (140). First mountings (140) more stiffly resist engine vibration than second mountings (142), thereby dynamically balancing the powerplant with respect to the structural frame (20).

5 Claims, 8 Drawing Figures

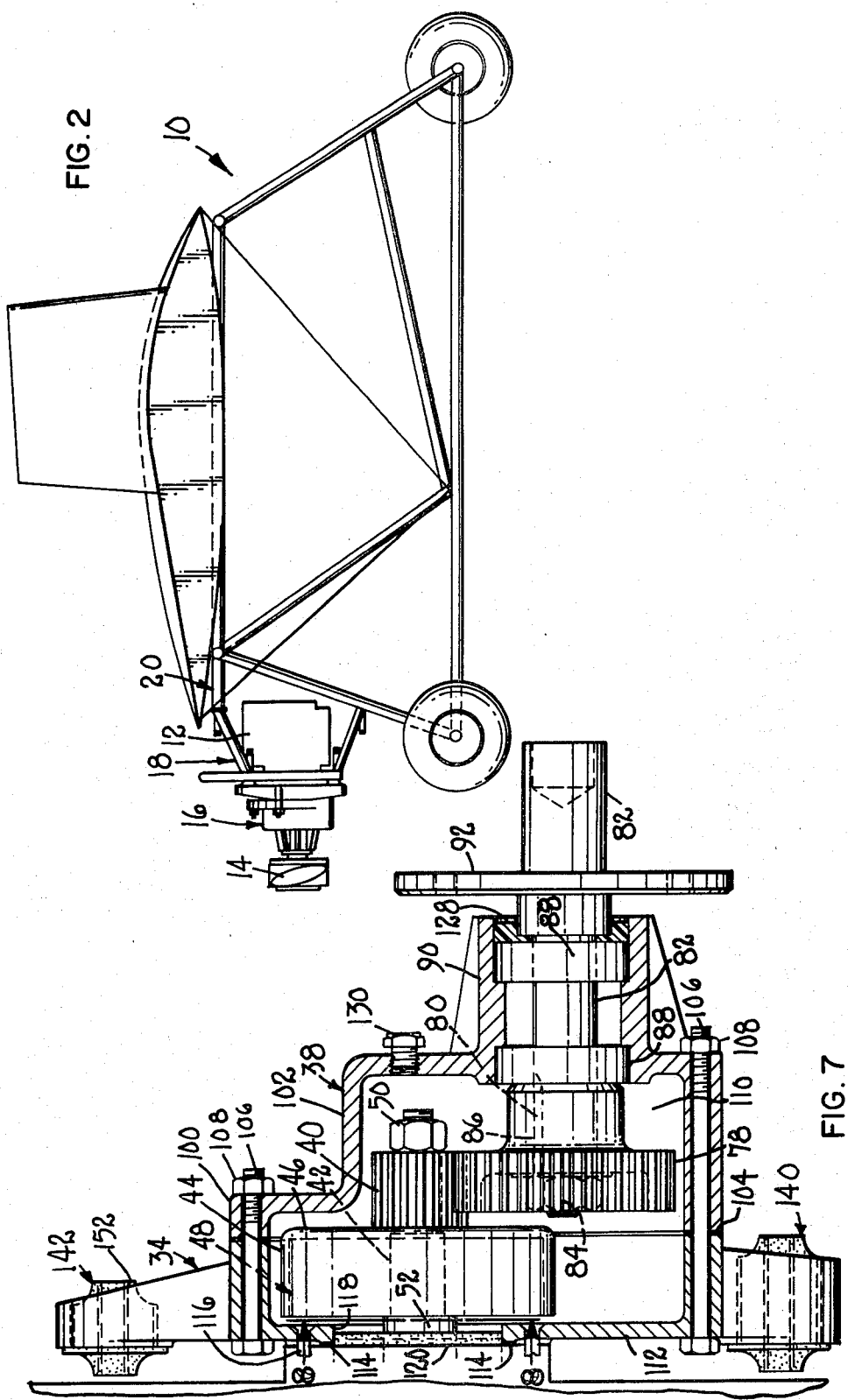

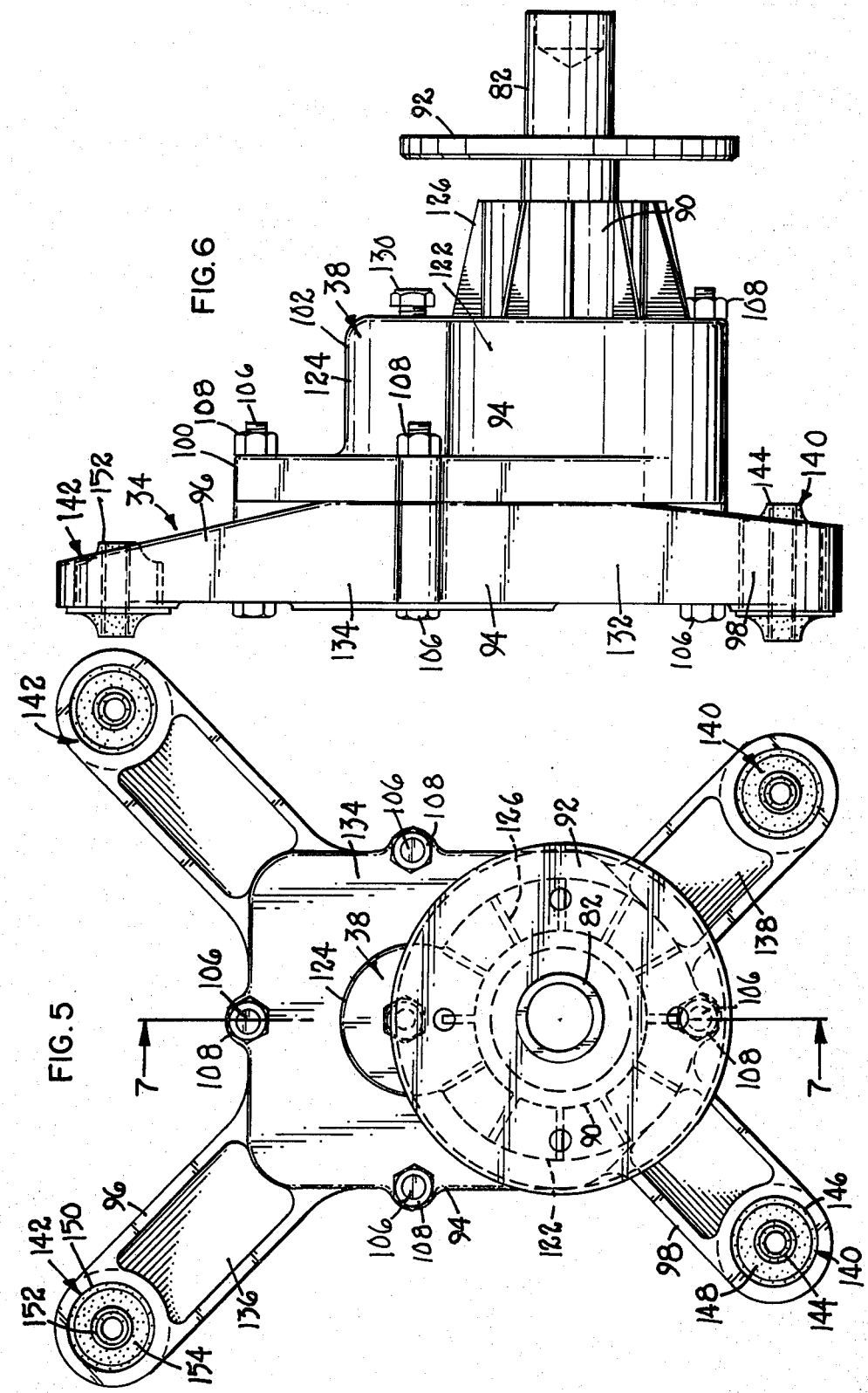

CONNECTING APPARATUS FOR A POWERPLANT

TECHNICAL FIELD

This invention relates to a connecting apparatus for a powerplant and, more particularly, to an apparatus which provides a clutch and gear reduction between the engine and the propellor or fan and which has a housing for the indicated mechanism providing a dynamically balanced bracket attached integrally thereto for holding the engine and propellor to a frame.

BACKGROUND OF THE INVENTION

In recent years, hang-gliding has captured the imagination of several aviation buffs. In the early years, hang-gliding required a mountain side or a cliff from which to launch. Hence, the sport was geographically limited. It was not long, however, before enthusiasts of the sport added engines so that flatlanders could participate. Powered hang-gliders have become to be known as ultralight aircraft.

In the United States, ultralight aircraft remain unregulated as long as the device is foot-launchable, even though landing gear may be present for convenience.

Early models of ultralight aircraft used a direct drive connection between the engine and the propellor. Often, power was limited with these units, and the rate of climb was slow. More recently, engine power and speed have been increased by correspondingly reducing rotative speed between the engine and the propellor with pulleys and belts.

The sport of power hang-gliding or the flying of ultralight aircraft has been and remains, however, extremely dangerous. Several pilots have crashed to their deaths. Successful flight has been described as an art since weight must be shifted rapidly as wind gusts or drafts affect the wing foils or as propellor thrust varies according to movement of the engine throttle. Present ultralight aircrafts have the further problem that as the throttle is varied, not only does the magnitude of the thrust change, but also the direction of the thrust line changes. The present invention was developed in response to this latter problem. It should be pointed out, however, that, regardless of the reason spawning its development, the present invention has application in areas not related to ultralight aircraft. For example, powerplants comprised of engines driving propellors while attached to a frame are used in conjunction with smoke generators during frost periods in fruit orchards.

SUMMARY OF THE INVENTION

The present invention is directed to a connecting apparatus for an engine mounted to a structural frame. The engine is used for driving a rotary load. The connecting apparatus is comprised of dynamically balanced means for isolating from said frame vibrations from said engine and speed sensitive means for releasibly coupling the engine to the rotary load.

In a preferred embodiment, an engine is connected to a propellor through a gear train which includes a centrifugal clutch device. The clutch and gear mechanisms are enclosed in a housing filled with lubricant. A portion of the housing extends outwardly as a bracket to attach in a dynamically balanced fashion the engine and propellor assembly to a structural frame.

The bracket has a spider-like shape with apertures at the ends of each of the legs. The apertures are filled with vibration dampening mountings comprised of a pair of concentric cylinders having rubber bonded between them. The vibration dampening mountings have greater resistance to shear in the locations required to resist the greater vibratory torque of the engine, and lesser resistance to shear in the locations subjected to lesser vibratory forces. In this fashion, the connecting apparatus dynamically balances the thrust due to the propellor and engine relative to the structural frame to keep the thrust line constant regardless of the throttle setting of the engine.

These advantages and other objects obtained by the use of the present invention may be better understood by reference to the drawings which form a further part hereof, and to the accompanying descriptive matter in which there is illustrated and described a preferred embodiment of the invention.

BRIEF DESCRIPTION OF THE DRAWINGS

FIG. 2 is a side view of the aircraft in FIG. 1;

FIG. 5 is an end view of connecting apparatus in accordance with the present invention;

FIG. 6 is a side view of the apparatus shown in FIG. 5;

FIG. 7 is a partial sectional view taken approximately along line 7—7 of FIG. 5.

DETAILED DESCRIPTION OF THE INVENTION

Figure 1:
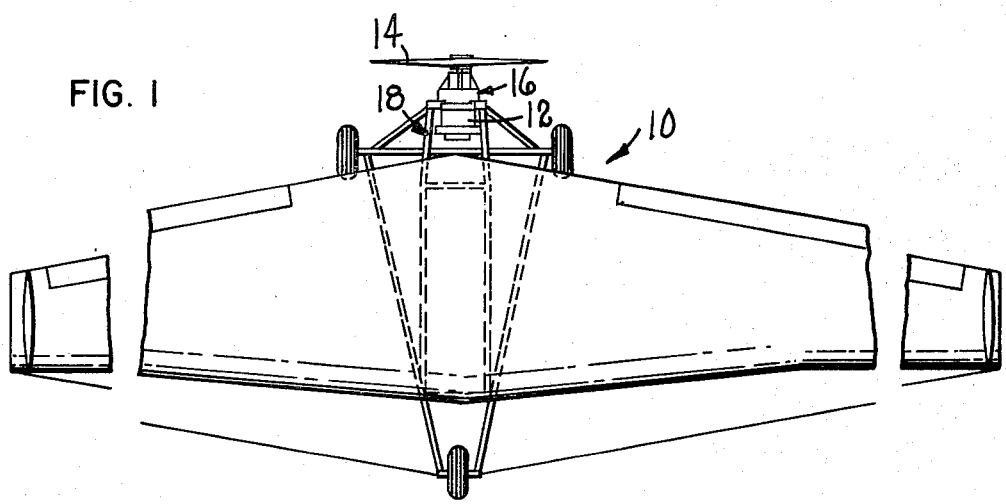
FIG. 1 is a top view of an ultralight aircraft having apparatus in accordance with the present invention.

Referring now to the drawings wherein like reference numerals designate identical or corresponding parts throughout the several views, and more particularly to FIG. 1, an ultralight aircraft exemplary of the type with which the present invention may be used is designated by numeral 10. In FIG. 2, an engine 12 is shown driving a propellor 14 through connecting apparatus 16 in accordance with the present invention. Connecting apparatus 16 attaches to an intermediate frame 18 which fastens the indicated powerplant to the structural frame 20 of aircraft 10. As indicated previously, although the present invention is described in detail relative to an ultralight aircraft, it is to be understood that a connecting apparatus 16 in accordance with the present invention may as well be used in several other applications not specifically described herein or illustrated in the drawings attached hereto.

Figures 3, 4:
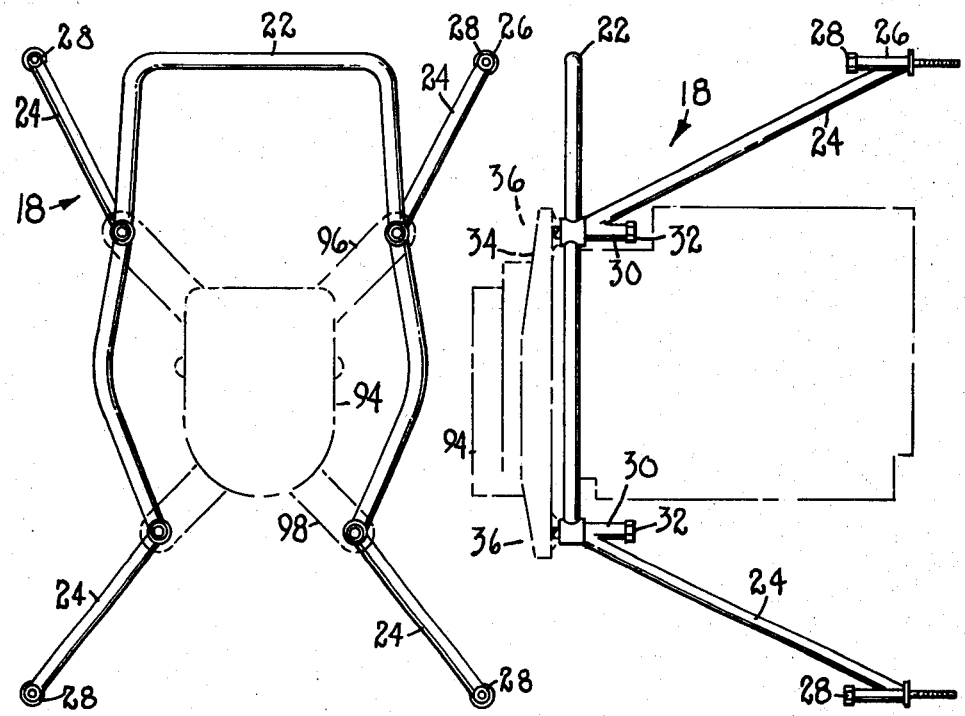
FIG. 3 is an end view of apparatus in accordance with the present invention attached to a representative framework for connection with the structural frame of an ultralight aircraft.
FIG. 4 is a side view of the apparatus shown in FIG. 3.

Intermediate frame 18 is shown more clearly in FIGS. 3 and 4. Intermediate frame 18 is not a necessary part of the present invention, but does show an adapter frame often needed between the connecting apparatus 16 of the present invention and the structural frame 20 of, in this case, an ultralight aircraft 10. Connecting frame 18 is comprised of a number of tubular members. Connecting apparatus 16 attaches to inverted U-shaped member 22. Four tubular legs 24 extend from U-shaped member 22 on the side opposite apparatus 16. A cylindrical boss 26 is fastened by weld or otherwise to each of the free ends of legs 24. Boss 26 has an aperture therethrough for attachment with a bolt 28 to structural frame 20. A second set of cylindrical bosses 30 are attached to the ends of legs 24 which fasten to U-shaped member 22. Bosses 30 also have apertures therethrough for the passage of bolts 32 for fastening spider bracket 34 with nuts 36. U-shaped member 22 has sufficient spacing between its legs, as well as sufficient contour of the legs, to pass around various parts of engine 12. Legs 24 extend angularly away from U-shaped member 22 as appropriate to provide the necessary connection between spider bracket 34 and the structural frame 20 of aircraft 10. Bosses 30 extend approximately perpendicularly away from U-shaped member 22 in order to provide a proper fastening joint with spider bracket 34. Bosses 26 are oriented as appropriate to provide a proper fastening joint with structural frame 20. Intermediate frame 18 thereby properly orients the powerplant to provide an appropriate thrust line for aircraft 10.

Connecting apparatus 16 is shown in FIGS. 5–7. Connecting apparatus 16 includes a housing 38 and spider bracket 34. The drive train between engine 12 and propellor 14 is enclosed within the enclosure formed by housing 38 and spider bracket 34 as fastened to engine 12. The drive train includes a drive gear 40 slideably mounted about the drive shaft 42 of engine 12. Drive gear 40 is axially spaced from and fixedly attached to a cylindrical shell 44. Shell 44 has a radial wall 46 extending inwardly from the cylindrical portion of shell 44 for attachment by weld or otherwise to a first side of drive gear 40. Wall 46 has a centered aperture axially aligned for passage therethrough of drive shaft 42. A shoulder of drive gear 40 protrudes through the aperture in wall 46 to slideably abut the hub 54 of a clutch device 48. Centrifugal clutch device 48, described hereinafter, is keyed to drive shaft 42 between wall 46 and a shoulder 52 on drive shaft 42 proximate engine 12. Thus, as drive shaft 42 increases in speed, clutch device 48 engages shell 44 to turn drive gear 40. Drive gear 40 is slidingly held in place between nut 50 threaded onto the end of drive shaft 42 and hub 54 of clutch device 48.

Figure 8:
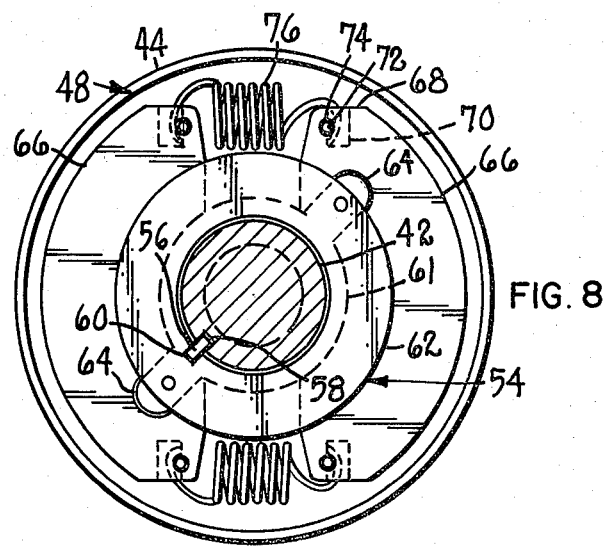
FIG. 8 is a partial sectional view of clutch apparatus in accordance with the present invention, taken along line 8—8 of FIG. 7.

As shown in FIG. 8, clutch device 48 is received about drive shaft 42. Hub 54 is fastened to drive shaft 42 with key 56 fitting in keyways 58 and 60 of drive shaft 42 and hub 54, respectively. Hub 54 has a sufficiently thick annular central portion to allow for the groove of keyway 60. A pair of flanges 62 extend outwardly to a greater diameter beyond the annular central portion of hub 54. A pair of guide walls 64 extend radially outwardly from opposite sides of central portion 61. Guide walls 64 extend between flanges 62 and project in a semi-cylindrical fashion beyond the diameter of flanges 62.

A pair of identically shaped weights 66 rest in the region between central portion 61 of hub 54 and the inner surface of shell 44. A weight 66 has width slightly less than the distance between flanges 62. The inner side of weight 66 has a concave, semi-cylindrical shape with diameter approximately the same as the central portion 61 of hub 62. A slot is cut into weight 66 to match and loosely receive guide wall 64. The outer wall of weight 66 is also semi-cylindrical with a diameter the same as the inner diameter of shell 44. Near each end, the outer diameter of weight 66 is contoured along a chord before being squared to extend substantially radially inwardly to the inner diameter. A cavity 70 is bored centrally in each chord surface 68. A pin 72 is pressed into an aperture 74 extending laterally through weight 66 such that pin 72 passes through the portion of aperture 70 nearest the end of weight 66. A pair of coil springs 76 extend between matching ends of the pair of opposing weights 66. The ends of springs 76 pass into apertures 70 to be retained about pins 72. Thus, springs 76 hold weights 66 against the central portion 61 of hub 62 as guided by guide walls 66. When clutch device 48 is rotated rapidly, centrifugal force overcomes the compressive force of springs 76 allowing the outer surface of weights 66 to frictionally contact the inner surface of wall 44. As drive shaft 42 rotates hub 62 because of key 56, hub 62 rotates weights 66 and shell 44 because of the engagement of guide wall 64 with weights 66. Drive gear 40 in turn rotates with shell 44.

Relatively small drive gear 40 drives relatively large driven gear 78. In this way, a gear reduction is accomplished. Driven gear 78 is keyed at 80 to driven shaft 82. Nut 84 further retains driven gear 78 and key 86 in keyway 80. Driven shaft 82 is held within housing 38 and aligned with a pair of spaced-apart bearings 88 pressed in opposite ends of a neck portion 90 of housing 38. Propellor 14 is fastened to a flange 92 welded or otherwise attached to the free end of driven shaft 82 extending outside of housing 38.

As shown in FIGS. 5 and 6, the central portion 102 of housing 38 is comprised generally of a larger cylindrical portion 122 to receive driven gear 78 and a smaller cylindrical portion 124 proximate to portion 122 to receive drive gear 40. Centered on and extending outwardly from cylindrical portion 122 is neck portion 90. Neck portion 90 is generally cylindrical and smaller than larger cylindrical portion 122. A plurality of heat-dissipating veins triangularly extend from one end of neck portion 90 to abut with larger cylindrical portion 122 at the other end of neck portion 90. As shown in FIG. 7, a sealing element 128, commonly known to those skilled in the art, is pressed into the end of neck portion 90 adjacent the outermost bearing 88 to seal the axial opening, through which driven shaft 82 passes, in the space between driven shaft 82 and the surface of the aperture in neck portion 90.

A pressure release valve 130, commonly known, is installed in a wall of central portion 102.

Spider bracket 34 and housing 38 together form an enclosure. In the illustrated embodiment, spider bracket 34 is comprised of a body portion 94, a pair of upper legs 96 and a pair of lower legs 98. Housing 38 is comprised of a flange portion 100, a central portion 102 and a neck portion 90. Spider bracket 34 and housing 38 have correspondingly flat surfaces which mate against opposite sides of gasket 104 to form a seal when compressed by a plurality of nut and bolt combinations 106 and 108. The body portion 94 of spider bracket 34 and housing 38 cooperate to form an enclosing cavity 110 within which are located clutch device 48, drive and driven gears 40 and 78, drive and driven shaft 42 and 82, and bearings 88. Cavity 110 is filled with a commonly known lubricating oil to dissipate heat and reduce friction. The body portion 94 of spider bracket 34 has a wall 112 on the side opposite housing 38. Wall 112 is contoured to include a flat surface for compressing a gasket 114 against a complimentary surface on engine 12. A plurality of screws 116 pass through openings in wall 112 to thread into openings in engine 12, thereby attaching engine 12 to spider bracket 34. Centered within the pattern of screws 116 is a cylindrical aperture 118.

Drive shaft 42 is axially aligned with and passes through aperture 118. A sealing element 120 commonly known to those familiar with the art is pressed into aperture 118 to seal the space between the walls of aperture 118 and drive shaft 42.

Since weight is a prime consideration in the design of an ultralight aircraft, weight must also be a prime consideration with regard to spider bracket 34 and housing 38. Thus, the shape of the enclosing walls about cavity 110 is designed to conserve material and hence reduce weight. It is to be understood, of course, that shapes not illustrated are well within the scope of the present invention.

The shape of cavity 110 within the flange portion 100 of housing 38 corresponds with the shape of cavity 110 within the body portion 94 of spider bracket 34. The shape is determined by the relative size and location of shell 44 of clutch device 48 and of driven gear 78. The lower portion generally aligns with the shape of the larger cylindrical portion 122 of central portion 102 of housing 38. The upper portion 134 surrounds and encloses clutch device 48. As shown in FIG. 5, upper portion 134 has a generally square, flanged shape, with the width being approximately the diameter of the rounded lower portion 132. The bolts of combinations 106 and 108 generally pass through ear portions of spider bracket 34 and housing 38. Since the lower portion 132 of spider bracket 34 conforms in shape with the flanged portion 100 and central portion 102 of housing 38, the bolt of combination 108 must be longer than the bolts of combinations 106 so as to extend to the neck portion side of central portion 102 of housing 38.

Upper and lower legs 96 and 98 extend at approximately 45 degrees with respect to the side of the body portion 94 of spider bracket 34 away from the corners of the body portion 94. The length of legs 96 and 98 is dependent on the mating connection with a structural frame, such as intermediate frame 18 in the present embodiment. Each leg 96 and 98 is made as light-weight as possible by forming cavities 136 and 138 between the outer walls and end wall of each of legs 96 and 98. Each of legs 96 and 98 ends in a solid portion having a cylindrical aperture extending therethrough. The apertures in legs 98 are filled appropriately with vibration dampening first mountings 140. Similarly, the apertures and legs 96 are filled with vibration dampening second mountings 142. First mountings 140 are comprised of a pair of concentric cylindrical shells 144 and 146 with rubber 148 bonded between the shells during vulcanization. Similarly, second mountings 142 are comprised of a pair of concentric cylindrical shells 150 and 152 with rubber 154 bonded between them. Rubber 148 and 154 effectively isolate from structural frame 20 of ultralight aircraft 10 the vibrations from engine 12. First and second mountings 140 and 142 are distinguished in that first mountings 140 are approximately twice as long as second mountings 142, as shown in FIG. 6. In this way, first mountings 140 more stiffly resist engine vibration than second mountings 142. First mountings 140 relative to second mountings 142 are rotationally advanced about the vibratory torque axis of engine 12 in the direction of greater vibratory force. In this way, as the throttle of engine 12 is increased, first mountings 140 more stiffly resist the vibrations of engine 12 than do second mountings 142 and, consequently, dynamically balance the powerplant of ultralight aircraft 10. Since the powerplant remains balanced, the thrust line of propellor 14 also maintains a constant direction thereby vastly enhancing the controllability of aircraft 10.

In use, connecting apparatus 16 provides an efficient clutch and gear reduction between engine 12 and propellor 14 and, at the same time, provides a housing with an integral bracket to dynamically balance the engine and propellor assembly with the structural frame 20 of ultralight aircraft 10. When engine 12 is started, propellor 14 is disengaged. As engine 12 increases in speed, clutch 48 functions.

In particular, hub 54 is keyed to and rotates with drive shaft 52. As the rotational speed increases, weights 66 move outwardly as centrifugal force overcomes the compressive force of springs 76. Weights 66 remain engaged with hub 54 because of guide walls 64. Weights 66 eventually move outwardly sufficiently so that the frictional force between the outer surfaces of weights 66 and the inner surface of shell 44 overcomes the forces throughout the remainder of the drive train resisting rotation. When weights 66 engage shell 44, drive gear 40 is caused to rotate. Gear 40 drives driven gear 78 causing driven shaft 82 and propellor 14 to rotate.

As indicated hereinbefore, bolts 32 pass through cylindrical shells 144 and 152 to hold spider bracket 34 to intermediate bracket 18, which in turn is fastened to the structural frame 20 of aircraft 10. The vibrations from engine 12 are damped by rubber 148 and 154 and, thereby isolated from the structural frame 20 of aircraft 10. Even more importantly, as the throttle of engine 12 is increased, the vibratory forces of the engine tend to torque the engine counter-clockwise as viewed in FIG. 2. The vibration dampening first mountings 140 more stiffly resist vibration than the vibration dampening second mountings 142. Hence, as the throttle is increased, even though the engine undergoes a counter-clockwise torque, the first and second vibration dampening mountings 140 and 142 effectively resist the torque at all magnitudes and, consequently, dynamically balance the powerplant relative to the structural frame 20. The vibration isolation or torque-resisting characteristics are particularly advantageous when engine 12 is a two-cycle engine, which is quite usual with ultralight aircraft.

Thus, the present invention as discussed in the foregoing description gives rise to numerous characteristics and advantages. It is to be understood, however, that the disclosure is illustrative only, and any changes made, especially in matters of shape, size and arrangement, to the full extent extended by the generally meaning of the terms in which the appended claims are expressed, are within the principle of the invention.

What is claimed is:

1. A connecting apparatus for an engine mounted to a structural frame, said engine for driving a rotary load, said engine having vibratory forces causing a greater torque in one direction than in a direction opposite therefrom, said apparatus comprising:

dynamically balanced means for isolating from said frame vibrations from said engine, said isolating means including a plurality of vibration dampening first mountings for more stiffly resisting engine vibration and a plurality of vibration dampening second mountings for less stiffly resisting engine vibrations, said first mountings being located rotationally advanced in the direction of greater vibratory force from said second mountings; and speed sensitive means for releasably coupling said engine to said rotary load.

2. The combination comprising:

a two-cycle engine having a drive shaft, said engine operating to produce vibratory forces causing a greater torque in one direction than in a direction opposite therefrom;

a structural frame for mounting said engine thereto;

a plurality of vibration dampening first mountings for more stiffly resisting engine vibrations;

a plurality of vibration dampening second mountings for less stiffly resisting engine vibrations, said first mountings being located relative to said second mountings rotationally advanced about the torque axis in the direction of greater vibratory force;

a bracket attached to said engine, said bracket having said first and second mountings secured thereto;

means for attaching said first and second mountings to said frame;

a rotary load; and means for coupling said drive shaft to said rotary load.

3. In an ultralight aircraft having a structural frame, a connecting apparatus for a powerplant, said powerplant including an engine having a drive shaft, said engine for driving a propellor, said connecting apparatus comprising:

a bracket attached to said engine, said bracket having a plurality of apertures;

a plurality of vibration dampening first mountings for more stiffly resisting engine vibrations;

a plurality of vibration dampening second mountings for less stiffly resisting engine vibrations, said first and second mountings being fastened within said apertures, said first mountings being located relative to said second mountings rotationally advanced about the vibratory torque axis in the direction of greater vibratory force;

means for attaching said first and second mountings to said frame;

a drive gear slideably mounted about said drive shaft;

a cylindrical shell axially spaced from and fixedly attached to said drive gear;

centrifugal clutch means, attached to said drive shaft, for operably transmitting power from said drive shaft to said shell;

a driven gear attached to a driven shaft for ultimately driving said propellor, said driven gear being driven by said drive element;

a housing, comprised partially of said bracket, for enclosing said drive and driven gears, said shell and said centrifugal clutch means; and lubricant contained in said housing for continuously bathing said drive and driven gears, said shell and said centrifugal clutch means.

4. An apparatus in accordance with claim 3 wherein said vibration dampening first and second mountings are comprised of a pair of concentric cylindrical shells with rubber bonded therebetween.

5. An apparatus in accordance with claim 4 wherein the rubber in said first mountings has approximately twice the resistance to shear force as the rubber in said second mountings.

* * * * *